(12) United States Patent
Oura et al.

(10) Patent No.: US 7,679,702 B2
(45) Date of Patent: Mar. 16, 2010

(54) LIQUID CRYSTAL DISPLAY DEVICE AND LIQUID CRYSTAL DISPLAY APPARATUS USING LIQUID CRYSTAL DISPLAY DEVICE

(75) Inventors: Hideo Oura, Yokohama (JP); Masanobu Yoshida, Yokohama (JP); Takuya Kakinuma, Yokohama (JP)

(73) Assignee: Victor Company of Japan, Ltd., Kanagawa-Ken (JP)

( * ) Notice: Subject to any disclaimer, the term of this patent is extended or adjusted under 35 U.S.C. 154(b) by 137 days.

(21) Appl. No.: 11/999,805

(22) Filed: Dec. 7, 2007

(65) Prior Publication Data

US 2008/0151132 A1 Jun. 26, 2008

(30) Foreign Application Priority Data

Dec. 26, 2006 (JP) .............................. 2006-349148

(51) Int. Cl.
G02F 1/1335 (2006.01)
(52) U.S. Cl. ......................................... 349/117; 349/84
(58) Field of Classification Search .................. 349/117
See application file for complete search history.

(56) References Cited

U.S. PATENT DOCUMENTS

2006/0170848 A1* 8/2006 Kawai et al. ................. 349/117

FOREIGN PATENT DOCUMENTS

| JP | 08-114799 | 5/1996 |
|---|---|---|
| JP | 11-344726 | 12/1999 |
| JP | 2000-002875 | 1/2000 |
| JP | 2004-12670 | 1/2004 |
| JP | 2005-156717 | 6/2005 |

OTHER PUBLICATIONS

Japanese Office Action (w/English Translation) (6 pages - dated Aug. 7, 2009).

* cited by examiner

*Primary Examiner*—Frank G Font
*Assistant Examiner*—Erin D Chiem
(74) *Attorney, Agent, or Firm*—Renner, Kenner, Greive, Bobak, Taylor & Weber

(57) ABSTRACT

A liquid crystal display device includes a first substrate having a plurality of pixel electrodes formed thereon in a matrix fashion, a second substrate having a common electrode formed thereon as facing the pixel electrodes with a specific gap, a liquid crystal filled in the gap, and a multi-layered optical film formed on the pixel electrodes. The multi-layered optical film has a first optical film that exhibits a first refractive index, a second optical film formed on the first optical film, the second optical film exhibiting a second refractive index higher than the first refractive index, and a third optical film formed on the second optical film, the third optical film exhibiting a specific resistance ranging from $1 \times 10^9$ Ωcm to $8 \times 10^{12}$ Ωcm.

17 Claims, 7 Drawing Sheets

| FACTOR TO BE ASSESSED | SPECIFIC RESISTANCE OF DIELECTRIC FILM [Ωcm] | | | | | | | | | | | |
|---|---|---|---|---|---|---|---|---|---|---|---|---|
| | $1 \times 10^8$ | $5 \times 10^8$ | $8 \times 10^8$ | $1 \times 10^9$ | $5 \times 10^9$ | $1 \times 10^{10}$ | $5 \times 10^{10}$ | $1 \times 10^{11}$ | $5 \times 10^{11}$ | $1 \times 10^{12}$ | $8 \times 10^{12}$ | $1 \times 10^{13}$ | $5 \times 10^{13}$ |
| VARIATION IN OFFSET VOLTAGE | GOOD | GOOD | GOOD | GOOD | GOOD | GOOD | GOOD | GOOD | GOOD | GOOD | GOOD | NG | NG |
| BURNING | GOOD | GOOD | GOOD | GOOD | GOOD | GOOD | GOOD | GOOD | GOOD | GOOD | GOOD | NG | NG |
| IMAGE BLUR | NG | NG | NG | GOOD | GOOD | GOOD | GOOD | GOOD | GOOD | GOOD | GOOD | GOOD | GOOD |
| PIXEL-ELECTRODE REFLECTIVITY | GOOD | GOOD | GOOD | GOOD | GOOD | GOOD | GOOD | GOOD | GOOD | GOOD | GOOD | GOOD | GOOD |

TABLE 1

FIG. 6

TABLE 2

| | | MULTI-LAYERED OPTICAL FILM | | | | | | | | DEVICE CHARACTERISTICS | |
|---|---|---|---|---|---|---|---|---|---|---|---|
| | PIXEL ELECTRODE | 1ST LOW REFRACTIVE FILM | 1ST HIGH REFRACTIVE FILM | 2ND LOW REFRACTIVE FILM | 2ND HIGH REFRACTIVE FILM | DIELECRIC FILM RESISTANCE | DIELECTRIC FILM SPECIFIC RESISTANCE [Ω·cm] | DIELECTRIC FILM | δVos (V) | OFFSET-VOLTAGE VARIATION TO BLUE-RANGE LIGHT | δVos VARIATION AMONG DEVICES |
| 1ST EMBODIMENT | Al | SiO₂ | Ta₂O₅ | — | — | Nb₂O₅ | 1×10⁹ | — | -0.2 | GOOD | GOOD |
| | | | | | | Nb₂O₅+Ta₂O₅ | 1×10¹¹ | — | -0.2 | GOOD | GOOD |
| | | | | | | Nb₂O₅+Ta₂O₅ | 8×10¹² | — | -0.2 | GOOD | GOOD |
| | Al | SiO₂ | TiO₂ | — | — | Nb₂O₅ | 1×10⁹ | — | -0.2 | GOOD | GOOD |
| | | | | | | Nb₂O₅+Ta₂O₅ | 1×10¹¹ | — | -0.2 | GOOD | GOOD |
| | | | | | | Nb₂O₅+Ta₂O₅ | 8×10¹² | — | -0.2 | GOOD | GOOD |
| | Al | SiO₂ | ZrO₂ | — | — | Nb₂O₅ | 1×10⁹ | — | -0.2 | GOOD | GOOD |
| | | | | | | Nb₂O₅+Ta₂O₅ | 1×10¹¹ | — | -0.2 | GOOD | GOOD |
| | | | | | | Nb₂O₅+Ta₂O₅ | 8×10¹² | — | -0.2 | GOOD | GOOD |
| 2ND EMBODIMENT | Al | SiO₂ | Ta₂O₅ | SiO₂ | Ta₂O₅ | Nb₂O₅ | 1×10⁹ | — | -0.2 | GOOD | GOOD |
| | | | | | | Nb₂O₅+Ta₂O₅ | 1×10¹¹ | — | -0.2 | GOOD | GOOD |
| | | | | | | Nb₂O₅+Ta₂O₅ | 8×10¹² | — | -0.2 | GOOD | GOOD |
| | Al | SiO₂ | TiO₂ | SiO₂ | TiO₂ | Nb₂O₅ | 1×10⁹ | — | -0.2 | GOOD | GOOD |
| | | | | | | Nb₂O₅+Ta₂O₅ | 1×10¹¹ | — | -0.2 | GOOD | GOOD |
| | | | | | | Nb₂O₅+Ta₂O₅ | 8×10¹² | — | -0.2 | GOOD | GOOD |
| | Al | SiO₂ | ZrO₂ | SiO₂ | ZrO₂ | Nb₂O₅ | 1×10⁹ | — | -0.2 | GOOD | GOOD |
| | | | | | | Nb₂O₅+Ta₂O₅ | 1×10¹¹ | — | -0.2 | GOOD | GOOD |
| | | | | | | Nb₂O₅+Ta₂O₅ | 8×10¹² | — | -0.2 | GOOD | GOOD |
| 3RD EMBODIMENT | Al | SiO₂ | Ta₂O₅ | — | — | Nb₂O₅ | 1×10⁹ | SiO₂ | 0.0 | GOOD | EXECELLENT |
| | | | | | | Nb₂O₅+Ta₂O₅ | 1×10¹¹ | SiO₂ | 0.0 | GOOD | EXECELLENT |
| | | | | | | Nb₂O₅+Ta₂O₅ | 8×10¹² | SiO₂ | 0.0 | GOOD | EXECELLENT |
| | Al | SiO₂ | TiO₂ | — | — | Nb₂O₅ | 1×10⁹ | SiO₂ | 0.0 | GOOD | EXECELLENT |
| | | | | | | Nb₂O₅+Ta₂O₅ | 1×10¹¹ | SiO₂ | 0.0 | GOOD | EXECELLENT |
| | | | | | | Nb₂O₅+Ta₂O₅ | 8×10¹² | SiO₂ | 0.0 | GOOD | EXECELLENT |
| | Al | SiO₂ | ZrO₂ | — | — | Nb₂O₅ | 1×10⁹ | SiO₂ | 0.0 | GOOD | EXECELLENT |
| | | | | | | Nb₂O₅+Ta₂O₅ | 1×10¹¹ | SiO₂ | 0.0 | GOOD | EXECELLENT |
| | | | | | | Nb₂O₅+Ta₂O₅ | 8×10¹² | SiO₂ | 0.0 | GOOD | EXECELLENT |
| 4TH EMBODIMENT | Al | SiO₂ | Ta₂O₅ | SiO₂ | Ta₂O₅ | Nb₂O₅ | 1×10⁹ | SiO₂ | 0.0 | GOOD | EXECELLENT |
| | | | | | | Nb₂O₅+Ta₂O₅ | 1×10¹¹ | SiO₂ | 0.0 | GOOD | EXECELLENT |
| | | | | | | Nb₂O₅+Ta₂O₅ | 8×10¹² | SiO₂ | 0.0 | GOOD | EXECELLENT |
| | Al | SiO₂ | TiO₂ | SiO₂ | TiO₂ | Nb₂O₅ | 1×10⁹ | SiO₂ | 0.0 | GOOD | EXECELLENT |
| | | | | | | Nb₂O₅+Ta₂O₅ | 1×10¹¹ | SiO₂ | 0.0 | GOOD | EXECELLENT |
| | | | | | | Nb₂O₅+Ta₂O₅ | 8×10¹² | SiO₂ | 0.0 | GOOD | EXECELLENT |
| | Al | SiO₂ | ZrO₂ | SiO₂ | ZrO₂ | Nb₂O₅ | 1×10⁹ | SiO₂ | 0.0 | GOOD | EXECELLENT |
| | | | | | | Nb₂O₅+Ta₂O₅ | 1×10¹¹ | SiO₂ | 0.0 | GOOD | EXECELLENT |
| | | | | | | Nb₂O₅+Ta₂O₅ | 8×10¹² | SiO₂ | 0.0 | GOOD | EXECELLENT |
| KNOWN DEVICE | Al | SiO₂ | Ta₂O₃ | — | — | — | — | — | 0.2 | NG | NG |
| | Al | SiO₂ | TiO₂ | — | — | — | — | — | 0.2 | NG | NG |
| | Al | SiO₂ | ZrO₂ | — | — | — | — | — | 0.2 | NG | NG |
| | Al | SiO₂ | Ta₂O₃ | SiO₂ | Ta₂O₃ | — | — | — | 0.2 | NG | NG |
| | Al | SiO₂ | TiO₂ | SiO₂ | TiO₂ | — | — | — | 0.2 | NG | NG |
| | Al | SiO₂ | ZrO₂ | SiO₂ | ZrO₂ | — | — | — | 0.2 | NG | NG |

FIG. 10

LIQUID CRYSTAL DISPLAY DEVICE AND LIQUID CRYSTAL DISPLAY APPARATUS USING LIQUID CRYSTAL DISPLAY DEVICE

CROSS-REFERENCE TO RELATED APPLICATIONS

This application is based on and claims the benefit of priority from the prior Japanese Patent Application No. 2006-349148 filed on Dec. 26, 2007, the entire contents of which are incorporated herein by reference.

BACKGROUND OF THE INVENTION

The present invention relates to a liquid crystal display device and a liquid crystal display apparatus using the liquid crystal display device. Particularly, this invention relates to a reflective liquid crystal display device and a liquid crystal display apparatus using the reflective liquid crystal display device.

Projection liquid crystal display apparatuses, such as, a projector and a projection TV, are popular for displaying images on a large screen at high definition.

Brightness of images is one of the major factors in display performance in the projection liquid crystal display apparatuses. Higher aperture and higher reflectivity of pixel electrodes are a possible solution for brighter images in the liquid crystal display device of the projection liquid crystal display apparatuses.

The liquid crystal display device of the projection liquid crystal display apparatus is generally classified into a transparent type and a reflective type. The transparent type allows read light incident at one side of the device to pass through and emits the light at the other side, as display light. The reflective type reflects read light incident at one side of the device and emits the light at the same side, as display light. The reflective type is advantageous over the transparent type in brightness of images for its higher aperture than the latter type.

Brighter images require the reflectivity of 90% or higher for pixel electrodes. Such a high reflectivity is achievable according to, for example, Japanese Un-examined Patent Publication No. 2004-12670 (referred to as reference 1, hereinafter). The reference 1 discloses a pixel electrode of a multi-layered structure having a layer including aluminum and another layer including silver formed on the former layer, to achieve higher reflectivity.

Disclosed in Japanese Un-examined Patent Publication No. 11-344726, corresponding to U.S. Pat. No. 6,493,052, (referred to as reference 2, hereinafter) is another type of a pixel electrode with a multi-layered structure to achieve higher reflectivity. The multi-layered structure has a low refractive film formed on the pixel electrode and a high refractive film formed on the former film. The low refractive film is made of acrylic resin, polyimide, magnesium fluoride or silicon dioxide. The high refractive film is made of titanium dioxide, zirconia, ITO (indium tin oxide), silicon nitride or cerium dioxide.

The silver-made pixel electrode disclosed in the reference 1, however, raises a material cost for its expensive material of silver which is also hard to process (etching, etc.), thus improvements being required.

Experiments by the inventors of the present invention revealed the difficulty in production management in the reference 2 due to dependency of an offset voltage to the material of a high refractive film formed in the uppermost layer of the multi-layered structure, thus improvements being required.

Further experiments by the inventors of the present invention revealed disadvantages of the multi-layered structure disclosed in the reference 2: difficulty in achieving higher reflectivity in specific frequency ranges, particularly, in a blue wavelength range (for example, ranging from 430 nm to 460 nm) for the high refractive film discussed above, depending on the film material, such as, silicon nitride (SiN); and variation in offset voltage to extended exposure to light, particularly, of high energy emission in a blue wavelength range, causing burning to the liquid crystal display device.

SUMMARY OF THE INVENTION

A purpose of the present invention is to provide a liquid crystal display device and a liquid crystal display apparatus equipped with this device, that can restrict variation in offset voltages, particularly, in a blue-color wavelength range with no increase in material cost and difficulty in process.

The present invention provides a liquid crystal display device comprising: a first substrate having a plurality of pixel electrodes formed thereon in a matrix fashion; a second substrate having a common electrode formed thereon as facing the pixel electrodes with a specific gap; a liquid crystal filled in the gap; and a multi-layered optical film formed on the pixel electrodes and including: a first optical film that exhibits a first refractive index; a second optical film formed on the first optical film, the second optical film exhibiting a second refractive index higher than the first refractive index; and a third optical film formed on the second optical film, the third optical film exhibiting a specific resistance ranging from $1\times10^9$ Ωcm to $8\times10^{12}$ Ωcm.

Moreover, the present invention provides a liquid crystal display device comprising: a first substrate having a plurality of pixel electrodes formed thereon in a matrix fashion; a second substrate having a common electrode formed thereon as facing the pixel electrodes with a specific gap; a liquid crystal filled in the gap; and a multi-layered optical film formed on the pixel electrodes and including: a first optical film that exhibits a first refractive index; a second optical film formed on the first optical film, the second optical film exhibiting a second refractive index higher than the first refractive index; a third optical film formed on the second optical film, the third optical film exhibiting a third refractive index lower than the second refractive index; a fourth optical film formed on the third optical film, the fourth optical film exhibiting a fourth refractive index higher than the third refractive index; and a fifth optical film formed on the fourth optical film, the fifth optical film exhibiting a specific resistance ranging from $1\times10^9$ Ωcm to $8\times10^{12}$ Ωcm.

Furthermore, the present invention provides a liquid crystal display apparatus for displaying images on a screen comprising: a light source for emitting light; at least one liquid crystal display device for modulating the light for image displaying; and an optical component for directing the light emitted from the light source to the liquid crystal display device and the light modulated by the liquid crystal display device to the screen, wherein the liquid crystal display device includes: a first substrate having a plurality of pixel electrodes formed thereon in a matrix fashion; a second substrate having a common electrode formed thereon as facing the pixel electrodes with a specific gap; a liquid crystal filled in the gap; and a multi-layered optical film formed on the pixel electrodes and including: a first optical film that exhibits a first refractive index; a second optical film formed on the first optical film, the second optical film exhibiting a second refractive index higher than the first refractive index; and a third optical film formed on the second optical film, the third optical film exhibiting a specific resistance ranging from $1\times10^9$ Ωcm to $8\times10^{12}$ Ωcm.

Moreover, the present invention provides a liquid crystal display apparatus for displaying images on a screen comprising: a light source for emitting light; at least one liquid crystal display device for modulating the light for image displaying; and an optical component for directing the light emitted from the light source to the liquid crystal display device and the light modulated by the liquid crystal display device to the screen, wherein the liquid crystal display device includes: a first substrate having a plurality of pixel electrodes formed thereon in a matrix fashion; a second substrate having a common electrode formed thereon as facing the pixel electrodes with a specific gap; a liquid crystal filled in the gap; and a multi-layered optical film formed on the pixel electrodes and including: a first optical film that exhibits a first refractive index; a second optical film formed on the first optical film, the second optical film exhibiting a second refractive index higher than the first refractive index; a third optical film formed on the second optical film, the third optical film exhibiting a third refractive index lower than the second refractive index; a fourth optical film formed on the third optical film, the fourth optical film exhibiting a fourth refractive index higher than the third refractive index; and a fifth optical film formed on the fourth optical film, the fifth optical film exhibiting a specific resistance ranging from $1\times10^9$ Ωcm to $8\times10^{12}$ Ωcm.

Still, furthermore, the present invention provides a multi-layered optical film for use in a liquid crystal display device having pixel electrodes arranged in a matrix fashion with a specific gap therebetween, the multi-layered optical film comprising: a first low refractive film that exhibits a first refractive index; a first high refractive film formed on the first refractive film, the first high refractive film exhibiting a second refractive index higher than the first refractive index; and a first dielectric film formed on the first high refractive film, the first dielectric film exhibiting a specific resistance ranging from $1\times10^9$ Ωcm to $8\times10^{12}$ Ωcm, wherein the multi-layered optical film is formed on the pixel electrodes to prevent light to be incident below the pixel electrodes through the gap.

BRIEF DESCRIPTION OF DRAWINGS

FIG. 6 shows evaluation of the liquid crystal display device in the first embodiment of the present invention, depending on specific resistance of a dielectric film;

FIG. 10 shows evaluation of the liquid crystal display devices in the first to fourth embodiments of the present invention;

DETAILED DESCRIPTION OF PREFERRED EMBODIMENTS

Embodiments of the present invention will be disclosed with reference to drawings.

First Embodiment

Figure 1:
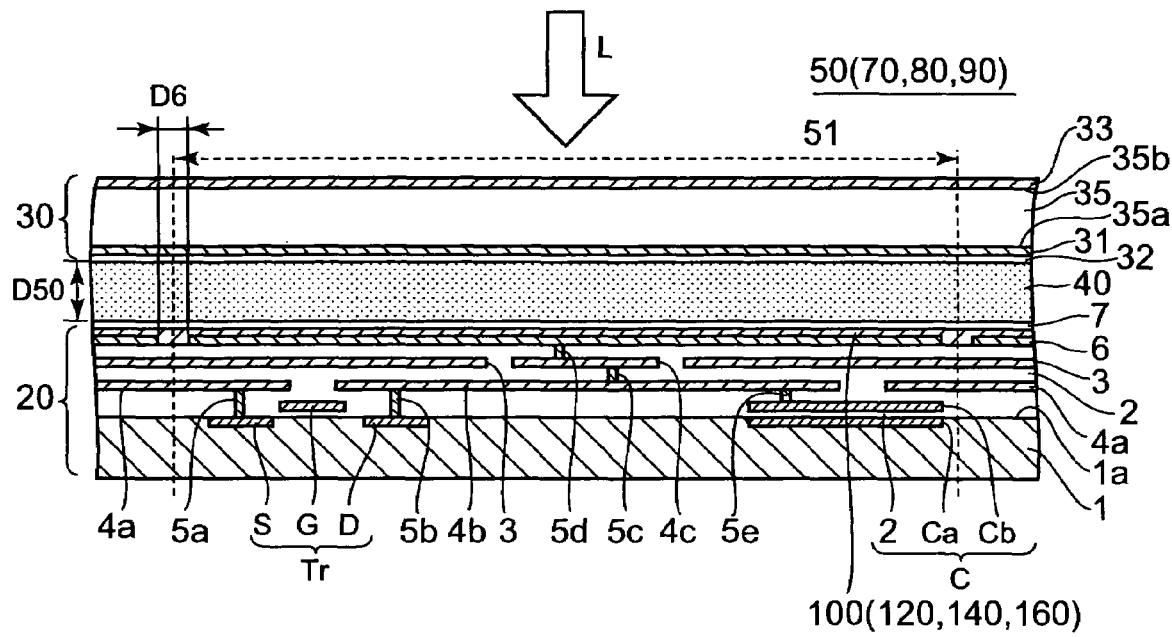
FIG. 1 shows a schematic cross-sectional view of a liquid crystal display device, applied to first to fourth embodiments of the present invention.

Shown in FIG. 1 is a liquid crystal display device 50 that is a first embodiment of the present invention. FIG. 1 will also be applied to liquid crystal display devices 70, 80 and 90 that are a second, a third and a fourth embodiment of the present invention, respectively, which will be disclosed layer.

As shown in FIG. 1, the major components of the liquid crystal display device 50 are: a liquid-crystal driver substrate 20 made through specific semiconductor processes on a first substrate 1 (a semiconductor substrate); a transparent second substrate 30 provided as facing the drive substrate 20 with a specific gap D50; and a liquid crystal 40 filled in the gap D50. The gap D50 is referred to as a cell gap D50, hereinafter.

Disclosed in detail first is the liquid-crystal driver substrate 20. Formed on a surface 1a (facing the second substrate 30) of the first substrate 1 are a source S, a drain D and a capacitor lower electrode Ca, with an insulating layer 2 over the surface 1a.

Formed in the insulating layer 2 are a gate G, a capacitor upper electrode Cb, a shading layer 3, wiring layers 4a, 4b and 4c, and vias 5a, 5b, 5c, 5d and 5e.

Formed in a matrix fashion on the insulating layer 2 are reflective pixel electrodes 6 with a specific gap D6. The electrodes 6 can be made of aluminum (Al), an Al alloy, etc.

Formed over the pixel electrodes 6 is a multi-layered optical film 100 (120, 140 or 160) covered with a first alignment film 7. The multi-layered optical films 120, 140 and 160 are used in the second, third and fourth embodiments of the present invention, respectively, which will be disclosed later. The multi-layered optical film 100 (120, 140 or 160) may also be referred to as an enhanced reflective film.

FIG. 1 illustrates one of the reflective pixel electrodes 6 formed in a matrix fashion.

Figure 2:
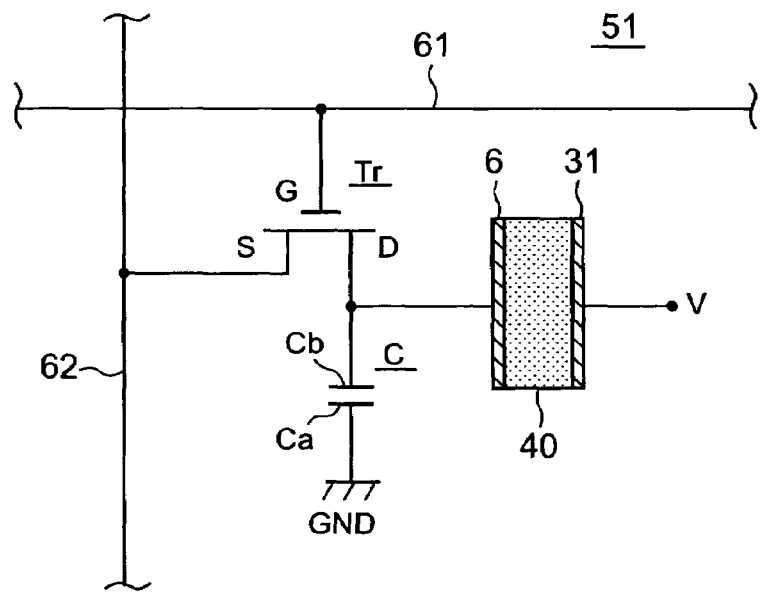
FIG. 2 shows an equivalent circuit representing each pixel in the liquid crystal display device, applied to the first to fourth embodiments of the present invention.

The source S is electrically connected to the wiring layer 4a through the via 5a. The wiring layer 4a is electrically connected to a signal line 62, as shown in FIG. 2, which will be described later. The drain D is electrically connected to the wiring layer 4b through the via 5b. The wiring layer 4b is electrically connected to the wiring layer 4c through the via 5c. The wiring layer 4c is electrically connected to the pixel electrode 6 through the via 5d. The gate G is electrically connected to a gate line 61 shown in FIG. 2, which will be described later.

The source S, the drain D and the gate G constitute a switching transistor Tr that drives the liquid crystal 40, as shown in FIG. 2.

The capacitor upper electrode Cb is electrically connected to the wiring layer 4b through the via 5e. The capacitor lower electrode Ca is grounded, as shown in FIG. 2.

The capacitor upper electrode Cb, the capacitor lower electrode Ca, and the insulating layer 2 provided between the electrodes Cb and Ca constitute a capacitor C.

The switching transistor Tr could be erroneously turned on to operate when reading light L, that is incident to the liquid crystal display device 50 from the transparent second substrate 30 side, passes through the gap D6 and reaches the transistor Tr.

In order to avoid such an erroneous operation, the shading layer 3 is provided under the gap D6 so that the reading light L passing through the gap D6 cannot reach the switching transistor Tr.

Disclosed next in detail is the second substrate 30. The substrate 30 is provided with a conductive and transparent common electrode 31 and a second transparent alignment film 32. The electrode 31 and the film 32 are formed in order on a transparent substrate 35 at a surface 35a that faces the liquid-crystal driver substrate 20 via the gap D50. The substrate 35 may be a glass substrate. The common electrode 31 and the second transparent alignment film 32 are provided in the zone on the substrate 30 side corresponding to the zone on the substrate 20 side where the pixel electrodes 6 are formed. Also formed on the substrate 35 but at a light-incident surface 35b is a reflection-preventing film 33. The light-incident surface 35b is situated on the opposite side of the substrate 35 with respect to the surface 35a.

The liquid crystal display device 50 in this embodiment has such a structure described above. This structure for each pixel electrode 6 constitutes one pixel 51, as shown in FIG. 2. The area in which the pixel electrodes 6 are formed in a matrix fashion is an image displaying area.

Each pixel 51 is described with an equivalent circuit shown in FIG. 2. FIG. 2 will also be applied to the second, third and fourth embodiments. The elements in FIG. 2 that correspond to the elements in FIG. 1 are given the same reference numerals.

In each pixel 51, as shown in FIG. 2, the gate G, the source S, and the drain D of the switching transistor Tr are electrically connected to the gate line 61, the signal line 62 for video signal transfer, and the pixel electrode 6 and the capacitor upper electrode Cb, respectively. The capacitor lower electrode Ca is grounded (GND). The common electrode 31 is connected to a voltage supply V.

A video signal is transferred along the signal line 62 while the gate G is on through the gate line 61 so that the pixels 51 are cyclically selected, thus the video signal being charged into the capacitor C as electric charges. The electric charges are supplied to the pixel electrode 6 for a specific period while the gated G is off, thus driving the liquid crystal 40 corresponding to this pixel electrode 6.

Figure 3:
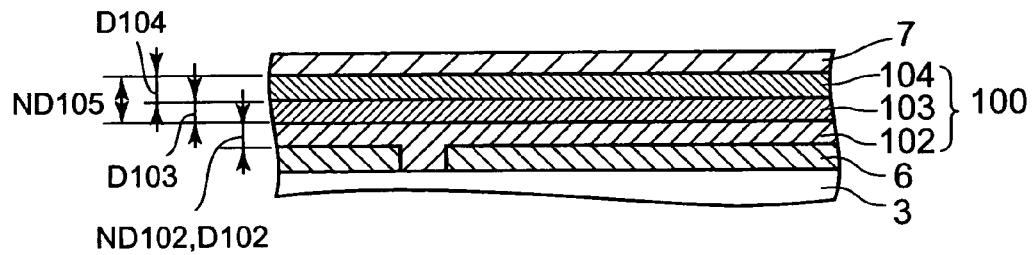
FIG. 3 shows a schematic cross-sectional view of a multi-layered optical film (and the adjacent sections shown in FIG. 1) of the liquid crystal display device in the first embodiment of the present invention.

Disclosed next in detail is the multi-layered optical film 100 of the liquid crystal display device 50, with reference to FIG. 3 which illustrates the film 100 and the adjacent sections in FIG. 1.

The multi-layered optical film 100 consists of a low refractive film 102, a high refractive film 103, and a dielectric film 104 formed in order on the pixel electrodes 6.

The low refractive film 102 exhibits a first refractive index n1. The high refractive film 103 exhibits a second refractive index n2 that is higher than the refractive index n1 (n1<n2). The dielectric film 104 exhibits a specific resistance in the range from $1 \times 10^9$ Ωcm to $8 \times 10^{12}$ Ωcm. The low and high refractive films and the dielectric film may be referred to as an optical film, which is also be applied to the second to fourth embodiments described later.

Formed on the multi-layered optical film 100 is the first alignment film 7, as already described.

Recommendable materials for the low refractive film 102, the high refractive film 103, and the dielectric film 104 are as follows:

the film 102 . . . silicon oxide ($SiO_2$);

the film 103 . . . tantalum oxide ($Ta_2O_5$), titanium oxide ($TiO_2$) or zirconium oxide ($ZrO_2$); and the film 104 . . . niobium oxide ($Nb_2O_5$) or a mixture of $Nb_2O_5$ and $Ta_2O_5$.

Silicon nitride (SiN) is not suitable for the high refractive film 103 for its lower refractive index of about 2.05.

The low refractive film 102, the high refractive film 103, and the dielectric film 104 can be formed with a known film forming process, such as, CVD (Chemical Vapor Deposition) and sputtering.

Feasible enhanced reflection can be achieved with: $¼\lambda_0$ for the optical thickness ND102 of the low refractive film 102; and $¼\lambda_0$ for the total optical thickness ND105 of the high refractive film 103 and the dielectric film 104, to the center wavelength $\lambda_0$ of the reading light L.

Discussed next in detail is the dielectric film 104, especially, the specific resistance of the film 104 that is the uppermost layer of the multi-layered optical film 100.

Experiments were conducted on the film forming process with respect to the specific resistance of the dielectric film 104.

Figure 4:
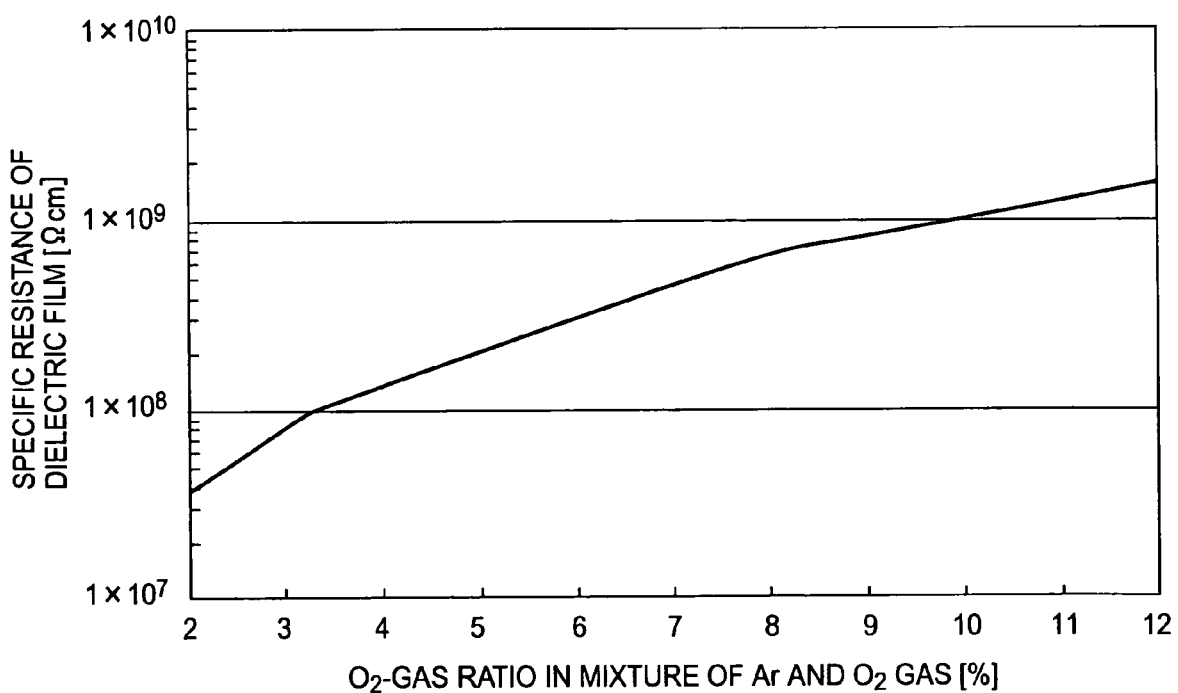
FIG. 4 shows a result of an experiment on dielectric-film formation through the first to fourth embodiments of the present invention.
Figure 5:
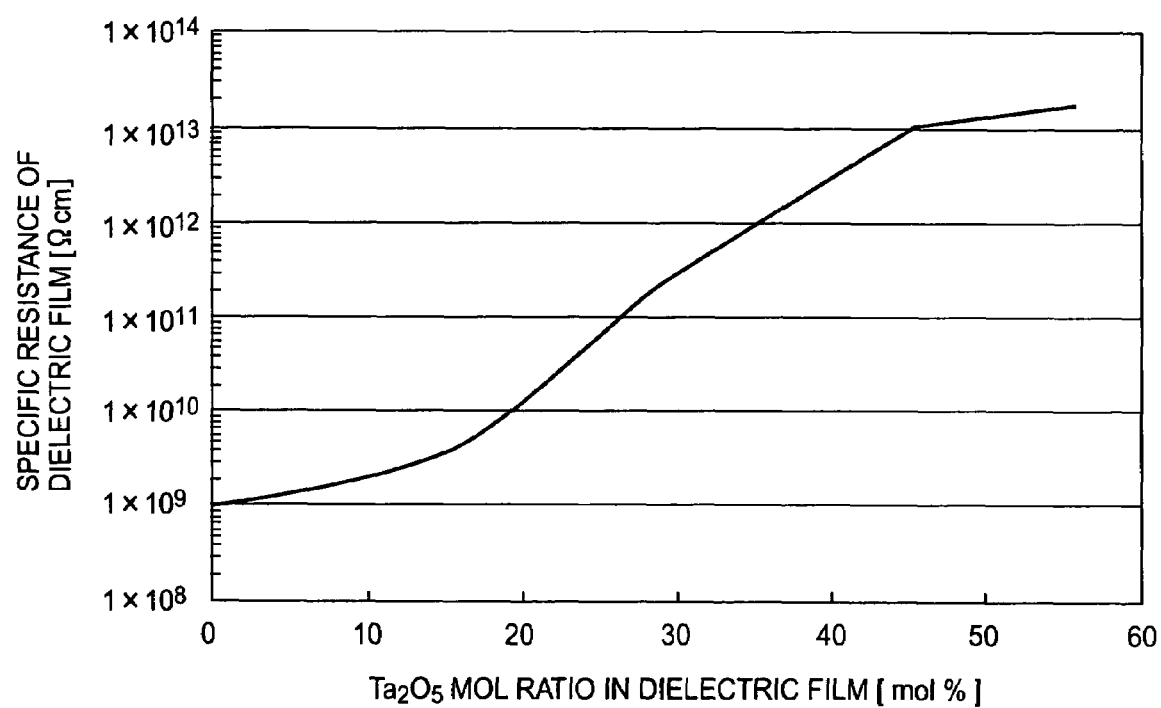
FIG. 5 shows another result of an experiment on dielectric-film formation through the first to fourth embodiments of the present invention.

The results are shown in FIGS. 4 and 5 which will also be applied to the second, third and fourth embodiments.

Several sample dielectric films 104 were formed by sputtering with the target of niobium oxide ($Nb_2O_5$) using a film-forming gas that is a mixture of oxygen ($O_2$) gas and argon (Ar) gas.

It was confirmed, as shown in FIG. 4, that a higher/lower ratio of the oxygen gas to the argon gas in the film-forming gas gives a higher/lower specific resistance to the dielectric film 104.

Other sample dielectric films 104 were formed by sputtering with the target of a mixture of niobium oxide ($Nb_2O_5$) and tantalum oxide ($Ta_2O_5$), using a film-forming gas, the mixture of oxygen ($O_2$) gas and argon (Ar) gas at 10% in ratio of $O_2$ in the film-forming gas.

It was confirmed, as shown in FIG. 5, that a higher/lower mol ratio of the tantalum oxide in the mixture gives a higher/lower specific resistance to the dielectric film 104.

Several sample liquid crystal displaying devices 50 were then produced using the sample dielectric films 104 discussed above.

The sample liquid crystal displaying devices 50 were evaluated on variation in offset voltage, burning, image blur, and also the reflectivity of the pixel electrodes having each sample dielectric film 104, when exposed to the light of a blue wavelength range from 430 nm to 460 nm.

The results of evaluation are shown in TABLE 1 of FIG. 6. The results are classified into two ranks indicated by terms "GOOD" and "NG" (No Good). For the variation in offset voltage, burning, and image blur, the term "GOOD" indicates there is almost no variation in offset voltage, burning or image blur whereas "NG", there is a variation in offset voltage, burning or image blur. For the reflectivity, the term "GOOD" indicates 90% or higher whereas "NG", lower than 90%.

TABLE 1 shows that the specific resistance in the range from $1\times10^9$ Ωcm to $8\times10^{12}$ Ωcm for the dielectric film 104 can avoid the variation in offset voltage, burning and image blur.

A possible reason for the image blur at the specific resistance of lower than $1\times10^9$ Ωcm for the dielectric film 104 is that a lower specific resistance allows electric charges stored on the surface of the dielectric film 104 to leak easily from the surface which causes incomplete application of voltages required to the pixel electrodes having the dielectric films 104, resulting in difficulty in control of the tilt angle of the liquid crystal.

A possible reason for the variation in offset voltage and image blur at the specific resistance of higher than $8\times10^{12}$ Ωcm for the dielectric film 104 is that a higher specific resistance allows charge up, or more than necessary storage of electric charges on the surface of the dielectric film 104.

Concerning the reflectivity, every sample exhibited 90% or higher to the light of a blue wavelength range from 430 nm to 460 nm. This is because that each sample had the multi-layered optical film 100 with the low refractive film 102, the high refractive film 103, and the dielectric film 104, but without involving silicon nitride (SiN) for the film 103.

Second Embodiment

Disclosed next is the liquid crystal display device 70 that is the second embodiment of the present invention. The difference between the first and second embodiments is the structure of the multi-layered optical films 100 (first embodiment) and 120 (second embodiment). The other elements shown in FIG. 1 are identical between the first and second embodiments and hence not described in detail.

Figure 7:
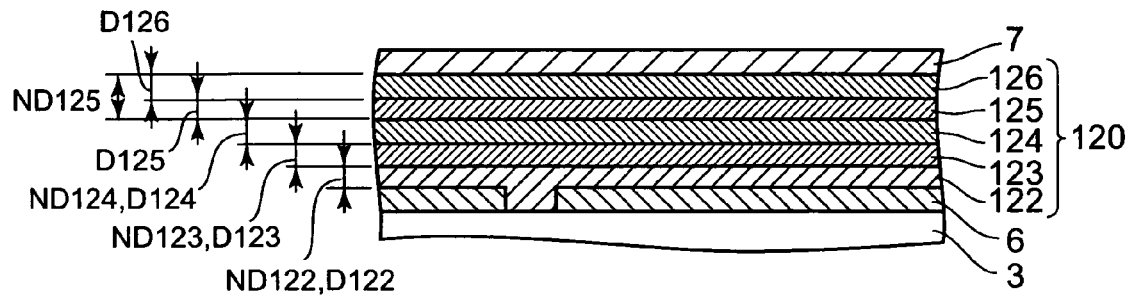
FIG. 7 shows a schematic cross-sectional view of a multi-layered optical film (and the adjacent sections shown in FIG. 1) of the liquid crystal display device in the second embodiment of the present invention.

FIG. 7 shows the multi-layered optical film 120 of the liquid crystal display device 70 and the adjacent sections in FIG. 1.

The multi-layered optical film 120 consists of a first low refractive film 122, a first high refractive film 123, a second low refractive film 124, a second high refractive film 125, and a dielectric film 126 formed in order on the pixel electrodes 6. Formed on the multi-layered optical film 120 is the first alignment film 7.

The first low refractive film 122 exhibits a first refractive index n1. The first high refractive film 123 exhibits a second refractive index n2 that is higher than the refractive index n1 (n1<n2). The second low refractive film 124 exhibits a third refractive index n3 that is lower than the refractive index n2 (n2>n3). The second high refractive film 125 exhibits a fourth refractive index n4 that is higher than the refractive index n3 (n3<n4). The refractive index n1 may be higher or lower than the refractive index n3. Likewise, the refractive index n2 may be higher or lower than the refractive index n4. The dielectric film 126 exhibits a specific resistance in the range from $1\times10^9$ Ωcm to $8\times10^{12}$ Ωcm.

Recommendable materials for the first and second low refractive films 122 and 124, the first and second high refractive films 123 and 125, and the dielectric film 126 are as follows:

the films 122 and 124 . . . silicon oxide ($SiO_2$);

the films 123 and 125 . . . tantalum oxide ($Ta_2O_5$), titanium oxide ($TiO_2$) or zirconium oxide ($ZrO_2$); and the film 126 . . . niobium oxide ($Nb_2O_5$) or a mixture of $Nb_2O_5$ and $Ta_2O_5$;

Silicon nitride (SiN) is not suitable for the first and second high refractive films 123 and 125 for its lower refractive index of about 2.05.

The first and second low refractive films 122 and 124, the first and second high refractive films 123 and 125, and the dielectric film 126 can be formed with a known film forming process, such as, CVD and sputtering.

Feasible enhanced reflective can be achieved with: $\frac{1}{4}\lambda_0$ for the optical thicknesses ND122, ND123 and ND124 of the first low refractive film 122, the first high refractive film 123, and the second low refractive film 124, respectively; and $\frac{1}{4}\lambda_0$ for the total optical thickness ND125 of the second high refractive film 125 and the dielectric film 106, to the center wavelength $\lambda_0$ of the reading light L.

The liquid crystal display device 70 was also evaluated on variation in offset voltage, burning, image blur, and the reflectivity of the pixel electrodes, in the same manner as shown in TABLE 1 of FIG. 6.

Like shown in TABLE 1, it was confirmed that the specific resistance in the range from $1\times10^9$ Ωcm to $8\times10^{12}$ Ωcm for the dielectric film 126 can avoid the variation in offset voltage, burning and image blur.

Also confirmed was that the reflectivity of 90% or higher is achieved to the light of a blue wavelength range from 430 nm to 460 nm, using the multi-layered optical film 120 without involving silicon nitride (SiN).

Third Embodiment

Disclosed next is the liquid crystal display device 80 that is the third embodiment of the present invention. The difference between the first and third embodiments is the structure of the multi-layered optical films 100 (first embodiment) and 140 (third embodiment). The other elements shown in FIG. 1 are identical between the first and third embodiments and hence not described in detail.

Figure 8:
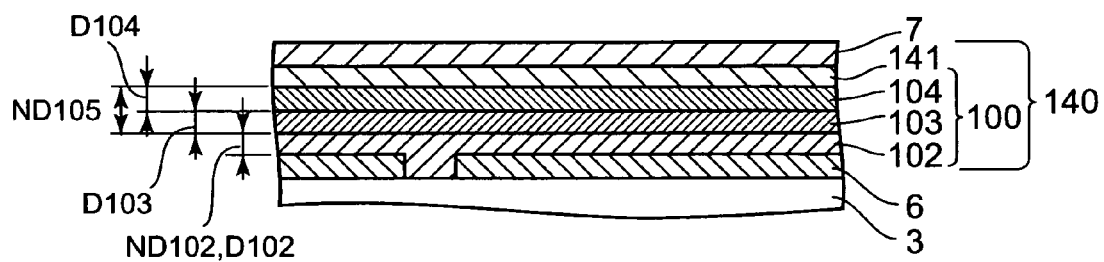
FIG. 8 shows a schematic cross-sectional view of a multi-layered optical film (and the adjacent sections shown in FIG. 1) of the liquid crystal display device in the third embodiment of the present invention.

FIG. 8 shows the multi-layered optical film 120 of the liquid crystal display device 80 and the adjacent sections in FIG. 1.

The multi-layered optical film 140 consists of a multi-layered optical film 100, identical to the counterpart 100 shown in FIG. 3, and a dielectric film 141 formed in order on the pixel electrodes 6. Formed on the multi-layered optical film 140 is the first alignment film 7.

The dielectric film 141 can be formed with a known film forming process, such as, CVD and sputtering.

The dielectric film 141 in the third embodiment is made of a single material of silicon oxide ($SiO_2$) at 20 nm in physical thickness. An option to the material of the film 141 is a composite film including silicon oxide.

Also confirmed in the third embodiment was that a higher reflectivity is achieved to the light of a blue wavelength range from 430 nm to 460 nm, using the multi-layered optical film 140 without involving silicon nitride (SiN).

Fourth Embodiment

Disclosed next is the liquid crystal display device 90 that is the fourth embodiment of the present invention. The difference between the first and fourth embodiments is the structure of the multi-layered optical films 100 (first embodiment) and 160 (fourth embodiment). The other elements shown in FIG. 1 are identical between the first and fourth embodiments and hence not described in detail.

Figure 9:
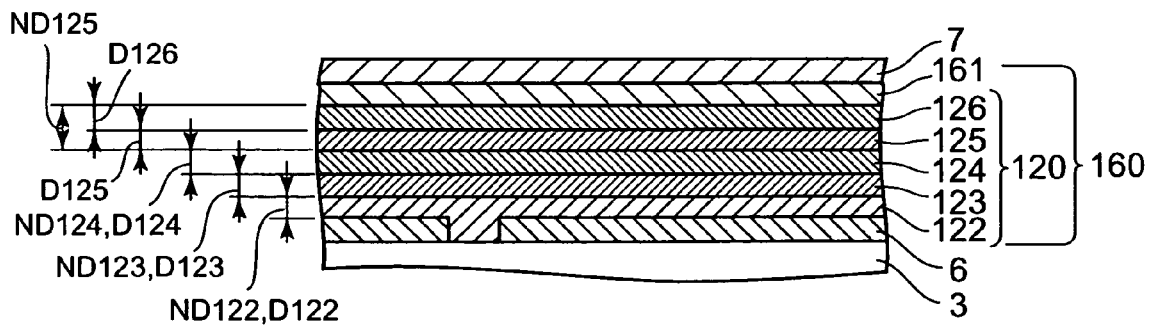
FIG. 9 shows a schematic cross-sectional view of a multi-layered optical film (and the adjacent sections shown in FIG. 1) of the liquid crystal display device in the fourth embodiment of the present invention.

FIG. 9 shows the multi-layered optical film 160 of the liquid crystal display device 90 and the adjacent sections in FIG. 1.

The multi-layered optical film 160 consists of a multi-layered optical film 120, identical to the counterpart 120 shown in FIG. 7, and a dielectric film 161 formed in order on the pixel electrodes 6. Formed on the multi-layered optical film 160 is the first alignment film 7.

The dielectric film 161 can be formed with a known film forming process, such as, CVD and sputtering.

The dielectric film 161 is made of a single material of silicon oxide ($SiO_2$) at 20 nm in physical thickness. An option to the material of the film 161 is a composite film including silicon oxide.

Also confirmed in the fourth embodiment was that a higher reflectivity is achieved to the light of a blue wavelength range from 430 nm to 460 nm, using the multi-layered optical film 140 without involving silicon nitride (SiN).

Several kinds of electrical characteristics were assessed for sample liquid crystal display devices 50, 70, 80 and 90 and sample known liquid crystal display devices with an ordinary structure, as shown in TABLE 2 of FIG. 10.

The assessed electrical characteristics were: deviation ($\delta$Vos) of a measured voltage from a reference offset voltage; variation in offset voltage at exposure to the light of a blue wavelength range from 430 nm to 460 nm; and variation in $\delta$Vos among the sample devices.

In TABLE 2 of FIG. 10, for the variation in offset voltage, the results are classified into two ranks indicated by terms "GOOD" and "NG". In detail, the term "GOOD" indicates there is almost no variation in offset voltage whereas "NG", a variation in offset voltage, when exposed to the light of the blue wavelength range.

Acceptable variation in $\delta$Vos among the sample devices is in the range from ±10% to ±30%, and more preferably, lower than ±10%, to the average of the variation, to avoid burning.

For $\delta$Vos, in TABLE 2, the results are classified into three ranks indicated by terms "EXCELLENT", "GOOD" and "NG". In detail, the terms "EXCELLENT", "GOOD" and "NG" indicate lower than ±10%, from ±10% to ±30%, and beyond ±30%, respectively, to the average of the variation, among 20 samples in each of the sample devices.

The sample liquid crystal display devices 50, 70, 80 and 90 were produced according to the film-forming requirements so that the dielectric films 100, 120, 140 and 160, respectively, exhibited the specific resistance of $1\times10^9$ $\Omega$cm, $1\times10^{11}$ $\Omega$cm or $8\times10^{12}$ $\Omega$cm.

The sample liquid crystal display devices listed in TABLE 2 of FIG. 10 are as follows:

(1) the sample liquid crystal display devices 50 (the first embodiment) with: the pixel electrodes made of aluminum (Al); the low refractive film 102 of silicon oxide ($SiO_2$); the high refractive film 103 of tantalum oxide ($Ta_2O_5$), titanium oxide ($TiO_2$) or zirconium oxide ($ZrO_2$); and the dielectric film 104 of niobium oxide ($Nb_2O_5$) or a mixture of $Nb_2O_5$ and $Ta_2O_5$ formed as exhibiting the specific resistance as listed, (2) the sample liquid crystal display devices 70 (the second embodiment) with: the pixel electrodes made of Al; the low refractive film 122 of $SiO_2$; the first high refractive film 123 of $Ta_2O_5$, $TiO_2$ or $ZrO_2$; the second low refractive film 124 of $SiO_2$; the second high refractive film 125 of $Ta_2O_5$, $TiO_2$ or $ZrO_2$; and the dielectric film 126 of $Nb_2O_5$ or a mixture of $Nb_2O_5$ and $Ta_2O_5$ formed as exhibiting the specific resistance as listed, (3) the sample liquid crystal display devices 80 (the third embodiment) with: the dielectric film 141 made of $SiO_2$, in addition to the same requirements as the first embodiment, (4) the sample liquid crystal display devices 90 (the fourth embodiment) with: the dielectric film 161 made of $SiO_2$, in addition to the same requirements as the second embodiment, and (5) known liquid crystal display devices with: pixel electrodes made of Al; a low refractive film of $SiO_2$; and a first high refractive film of $Ta_2O_5$, $TiO_2$ or $ZrO_2$; with or without a second low refractive film of $SiO_2$ and a second high refractive film of $Ta_2O_5$, $TiO_2$ or $ZrO_2$, with no dielectric film like those in the first to fourth embodiments.

TABLE 2 of FIG. 10 shows that the variation in offset voltage is more restricted in the liquid crystal display devices 50, 70, 80 and 90 of the present invention than the known devices.

Disclosed next are a fifth and a sixth embodiment of the present invention, which are liquid crystal display apparatuses equipped with the liquid crystal display device 50, 70, 80 or 90.

Fifth Embodiment

Figure 11:
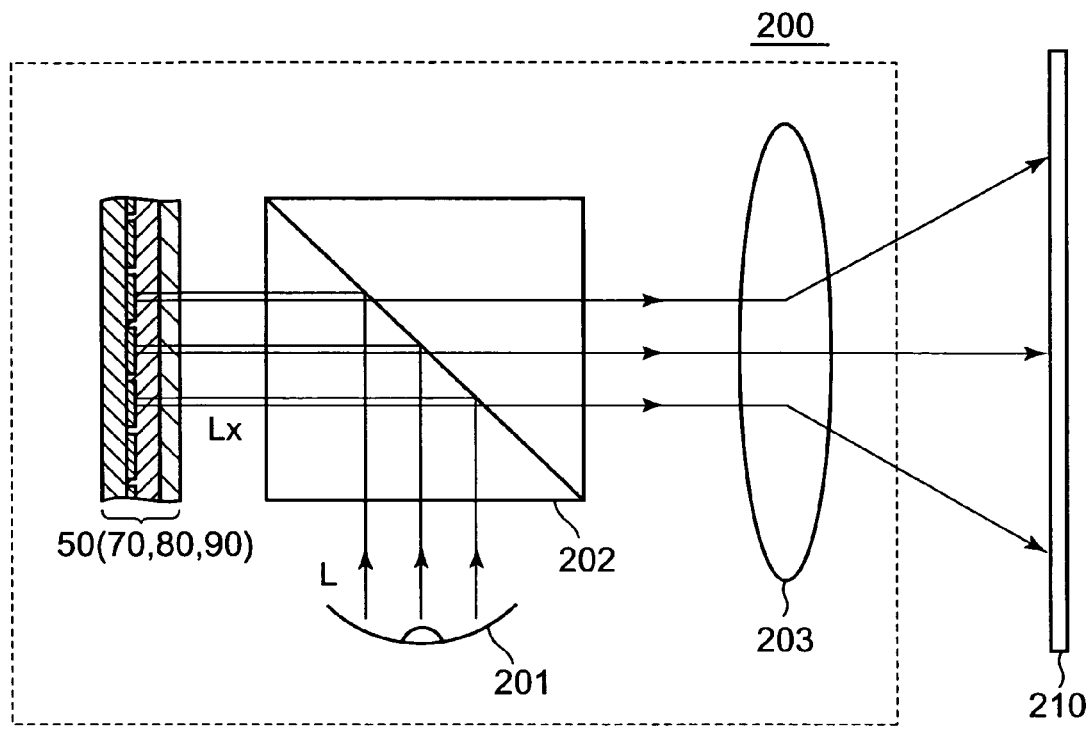
FIG. 11 shows a schematic cross-sectional view of a liquid crystal display apparatus in a fifth embodiment of the present invention, equipped with the liquid crystal display device in the first, second, third or fourth embodiment of the present invention.

A liquid crystal display apparatus 200 shown in FIG. 11 is equipped at least with a light source 201, the liquid crystal display device 50, 70, 80 or 90 (the first, the second, the third or the fourth embodiment), a polarization beam splitter (an optical component) 202, and a projection lens 203.

The light source 201 emits reading light L toward the polarization beam splitter 202. The light L is reflected by the splitter 202 so that it is polarized. The polarized light L is directed to the liquid crystal display device 50, 70, 80 or 90 and is reflected as display light Lx after modulation. The display light Lx passes through the splitter 202 and projected onto an external screen 210 via the projection lens 203.

The light source 201 emits light carrying a red color component (having a wavelength in the range, for example, from 610 nm to 700 nm), a green color component (having a wavelength in the range, for example, from 500 nm to 570 nm) or a blue color component (having a wavelength in the range, for example, from 430 nm to 460 nm), or carrying all of the three color components.

When the light source 201 emits: light carrying the red color component, it gives a red color image on the screen 210; the green color component, a green color image; and the blue color component, a blue color image.

When the light source 201 emits light carrying all of the three color components, it gives a full-color image on the screen 210, with the liquid crystal display device 50, 70, 80 or 90 equipped with a color filter for each pixel 51.

The liquid crystal display apparatus 200 equipped with the liquid crystal display device 50, 70, 80 or 90 can produce a bright image on the screen 210 for higher reflectivity of the device, as discussed through the first to fourth embodiments, to each color component.

Sixth Embodiment

Figure 12:
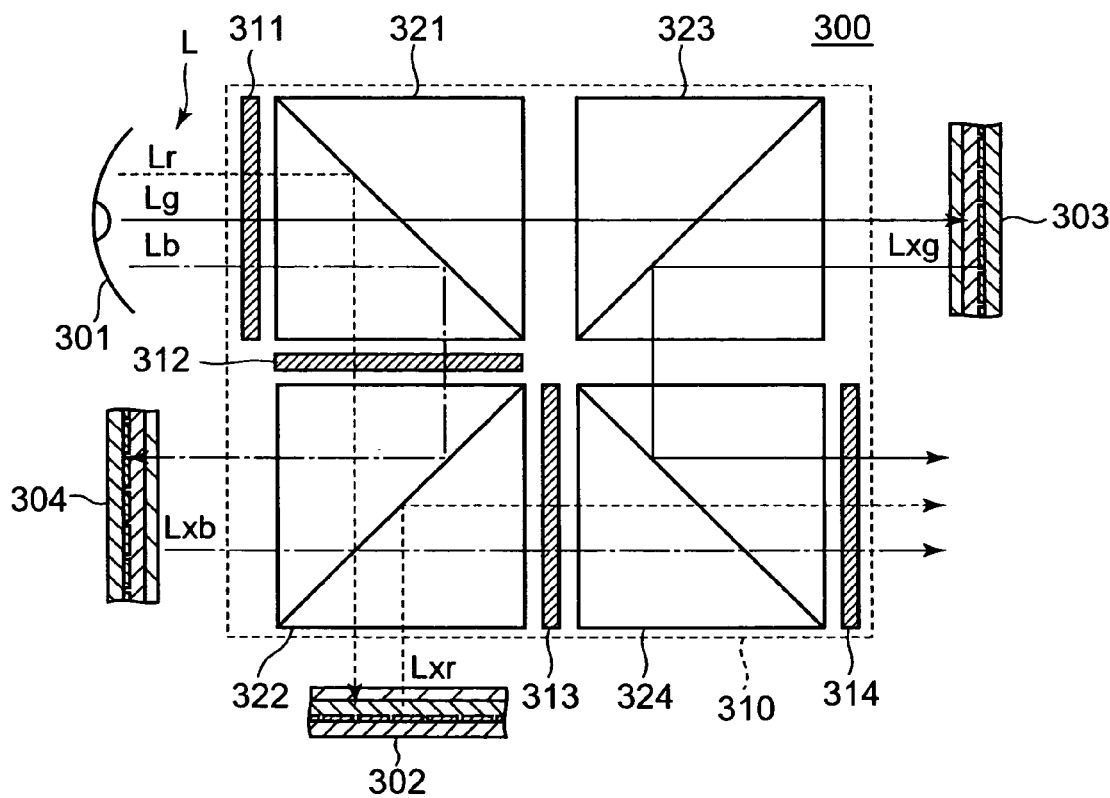
FIG. 12 shows a schematic cross-sectional view of a liquid crystal display apparatus in a sixth embodiment of the present invention, equipped with the liquid crystal display device in the first, second, third or fourth embodiment of the present invention.

A liquid crystal display apparatus 300 shown in FIG. 12 is equipped at least with a light source 301, an optical component 310, a first liquid crystal display device 302, a second liquid crystal display device 303, and a fourth liquid crystal display device 304. The devices 302, 303 and 304 correspond to the liquid crystal display device 50, 70, 80 or 90 in the first, the second, the third or the fourth embodiment, respectively.

The light source 301, for example, an extra-high pressure mercury lamp, emits reading light L that carries: an S-polarized red-color component Lr (having a wavelength in the range, for example, from 610 nm to 700 nm); an S-polarized green-color component Lg (having a wavelength in the range, for example, from 500 nm to 570 nm); and an S-polarized blue-color component Lb (having a wavelength in the range, for example, from 430 nm to 460 nm).

A operational principle of the liquid crystal display apparatus 300 is as follows:

The reading light L carrying the color components Lr, Lg and Lb is emitted to the optical component 310 and undergoes color separation. The color-separated light components Lr, Lg and Lb are directed to the liquid crystal display devices 302, 303 and 304, respectively, and modulated into display light Lxr, Lxg and Lxb, respectively. The display light Lxr, Lxg and Lxb are reflected by the devices 302, 303 and 304, respectively, and directed to the optical component 310 and undergoes color combining. The color-combined display light is emitted out from the liquid crystal display apparatus 300.

For the operation discussed above, the optical component 310 is equipped at least with a first polarizer 311, a second polarizer 312, a third polarizer 313, and a fourth polarizer 314, a first polarization beam splitter 321, a second polarization beam splitter 322, a third polarization beam splitter 323, and a fourth polarization beam splitter 324.

A detailed operation of the liquid crystal display apparatus 300 equipped with the optical component 310 for displaying a full-color image is as follows:

The reading light that L that carries the S-polarized red-color component Lr, the S-polarized green-color component Lg, and the S-polarized blue-color component Lb is emitted from the light source 301 to the first polarizer 311.

The S-polarized red-color component Lr is allowed to pass through the first polarizer 311 but is reflected by the first polarization beam splitter 321 toward the second polarizer 312. The component Lr is polarized by the polarizer 312 so that the polarization plane of the component Lr is rotated by 90°, thus converted into a P-polarized red-color component Lr. The P-polarized component Lr is allowed to pass through the second polarization beam splitter 322 and is modulated by the first liquid crystal display device 302 into an S-polarized red-color display light Lxr.

The S-polarized green-color component Lg is polarized by the first polarizer 311 so that the polarization plane of the component Lg is rotated by 90°, thus converted into a P-polarized green-color component Lg. The P-polarized component Lg is allowed to pass through the first and third polarization beam splitters 321 and 323 and is modulated by the second liquid crystal display device 303 into an S-polarized green-color display light Lxg.

The S-polarized blue-color component Lb is allowed to pass through the first polarizer 311 but is reflected by the first polarization beam splitter 321 toward the second polarizer 312. The S-polarized component Lb is allowed to pass through the polarizer 312 but is reflected by the second polarization beam splitter 322 toward the third liquid crystal display device 304. The S-polarized component Lb is modulated by the device 304 into a P-polarized blue-color display light Lxb.

The S-polarized red-color display light Lxr modulated by the first liquid crystal display device 302 is reflected by the second polarization beam splitter 322 toward the third polarizer 313. The light Lxr is polarized by the polarizer 313 so that the polarization plane of the light Lxr is rotated by 90°, thus converted into a P-polarized red-color display light Lxr. The P-polarized light Lxr is allowed to pass through the fourth polarization beam splitter 324 and the fourth polarizer 314.

The S-polarized green-color display light Lxg modulated by the second liquid crystal display device 303 is reflected by the third polarization beam splitter 323 toward the fourth polarization beam splitter 324. The S-polarized light Lxg is further reflected by the splitter 324 toward the fourth polarizer 314. The S-polarized light Lxg is polarized by the polarizer 314 so that the polarization plane of the light Lxg is rotated by 90°, thus converted into a P-polarized green-color display light Lxg and emitted therefrom.

The P-polarized blue-color display light Lxb modulated by the third liquid crystal display device 304 is allowed to pass through the second polarization beam splitter 322, the fourth polarization beam splitter 324, and then the fourth polarizer 314.

The P-polarized red- green- and blue-color display light Lxr, Lxg and Lxb passing through the fourth polarizer 314 is projected onto a screen via a projection lens (both not shown).

The liquid crystal display apparatus 300, equipped with the liquid crystal display device 50, 70, 80 or 90 for each of the liquid crystal display devices 302, 303 and 304, can produce a bright image on a screen for higher reflectivity of the display devices, as discussed through the first to fourth embodiments, to each color component.

It is understood by those skilled in the art that each foregoing description is a preferred embodiment of the present invention and that various changes and modifications can be made in the invention without departing from the sprit and scope thereof.

For example, in the first embodiment, several sample dielectric films 104 were formed by sputtering with the target of a mixture of niobium oxide ($Nb_2O_5$) and tantalum oxide ($Ta_2O_5$), using a film-forming gas, the mixture of oxygen ($O_2$) gas and argon (Ar) gas at 10% in ratio of $O_2$ to Ar. Such film 104 may however be formed by sputtering with a target of niobium oxide and another target of tantalum oxide (two-dimensional sputtering). A controlled ratio of electric power supplied to the two targets gives a desired mol ratio to tantalum oxide of the film 104.

Moreover, the dielectric films 141 and 161 in the third and fourth embodiments, respectively, are made as having 20 nm in physical thickness. It is however preferable to form the films 141 and 161 in the range from 6 nm to 100 nm to achieve feasible enhanced reflection and electrical characteristics. Nevertheless, a thinner film facilitates efficient control of the liquid crystal 40, and hence the film thickness is preferably determined within the range discussed above.

As disclosed above in detail, the present invention achieves restriction on offset voltage variation, particularly, in a blue-color wavelength range with no increase in material cost and difficulty in process.

What is claimed is:

1. A liquid crystal display device comprising:
   a first substrate having a plurality of pixel electrodes formed thereon in a matrix fashion;
   a second substrate having a common electrode formed thereon as facing the pixel electrodes with a specific gap;
   a liquid crystal filled in the gap; and
   a multi-layered optical film formed on the pixel electrodes and including:
   a first optical film that exhibits a first refractive index;
   a second optical film formed on the first optical film, the second optical film exhibiting a second refractive index higher than the first refractive index; and
   a third optical film formed on the second optical film, the third optical film exhibiting a specific resistance ranging from $1 \times 10^9$ Ωcm to $8 \times 10^{12}$ Ωcm.

2. The liquid crystal display device according to claim 1, wherein the third optical film includes niobium oxide or a mixture of niobium oxide and tantalum oxide.

3. The liquid crystal display device according to claim 1 further comprising a fourth optical film including oxide silicon and formed on the third optical film.

4. A liquid crystal display device comprising:
   a first substrate having a plurality of pixel electrodes formed thereon in a matrix fashion;
   a second substrate having a common electrode formed thereon as facing the pixel electrodes with a specific gap;
   a liquid crystal filled in the gap; and
   a multi-layered optical film formed on the pixel electrodes and including:
   a first optical film that exhibits a first refractive index;
   a second optical film formed on the first optical film, the second optical film exhibiting a second refractive index higher than the first refractive index;
   a third optical film formed on the second optical film, the third optical film exhibiting a third refractive index lower than the second refractive index;
   a fourth optical film formed on the third optical film, the fourth optical film exhibiting a fourth refractive index higher than the third refractive index; and
   a fifth optical film formed on the fourth optical film, the fifth optical film exhibiting a specific resistance ranging from $1 \times 10^9$ Ωcm to $8 \times 10^{12}$ Ωcm.

5. The liquid crystal display device according to claim 4, wherein the fifth optical film includes niobium oxide or a mixture of niobium oxide and tantalum oxide.

6. The liquid crystal display device according to claim 4 further comprising a sixth optical film including oxide silicon and formed on the fifth optical film.

7. A liquid crystal display apparatus for displaying images on a screen comprising:
   a light source for emitting light;
   at least one liquid crystal display device for modulating the light for image displaying; and
   an optical component for directing the light emitted from the light source to the liquid crystal display device and the light modulated by the liquid crystal display device to the screen,
   wherein the liquid crystal display device includes:
   a first substrate having a plurality of pixel electrodes formed thereon in a matrix fashion;
   a second substrate having a common electrode formed thereon as facing the pixel electrodes with a specific gap;
   a liquid crystal filled in the gap; and
   a multi-layered optical film formed on the pixel electrodes and including:
   a first optical film that exhibits a first refractive index;
   a second optical film formed on the first optical film, the second optical film exhibiting a second refractive index higher than the first refractive index; and
   a third optical film formed on the second optical film, the third optical film exhibiting a specific resistance ranging from $1 \times 10^9$ Ωcm to $8 \times 10^{12}$ Ωcm.

8. The liquid crystal display apparatus according to claim 7, wherein the third optical film includes niobium oxide or a mixture of niobium oxide and tantalum oxide.

9. The liquid crystal display apparatus according to claim 7 further comprising a fourth optical film including oxide silicon and formed on the third optical film.

10. A liquid crystal display apparatus for displaying images on a screen comprising:
    a light source for emitting light;
    at least one liquid crystal display device for modulating the light for image displaying; and
    an optical component for directing the light emitted from the light source to the liquid crystal display device and the light modulated by the liquid crystal display device to the screen,
    wherein the liquid crystal display device includes:
    a first substrate having a plurality of pixel electrodes formed thereon in a matrix fashion;
    a second substrate having a common electrode formed thereon as facing the pixel electrodes with a specific gap;
    a liquid crystal filled in the gap; and
    a multi-layered optical film formed on the pixel electrodes and including:
    a first optical film that exhibits a first refractive index;
    a second optical film formed on the first optical film, the second optical film exhibiting a second refractive index higher than the first refractive index;
    a third optical film formed on the second optical film, the third optical film exhibiting a third refractive index lower than the second refractive index;
    a fourth optical film formed on the third optical film, the fourth optical film exhibiting a fourth refractive index higher than the third refractive index; and
    a fifth optical film formed on the fourth optical film, the fifth optical film exhibiting a specific resistance ranging from $1 \times 10^9$ Ωcm to $8 \times 10^{12}$ Ωcm.

11. The liquid crystal display apparatus according to claim 10, wherein the fifth optical film includes niobium oxide or a mixture of niobium oxide and tantalum oxide.

12. The liquid crystal display apparatus according to claim 10 further comprising a sixth optical film including oxide silicon and formed on the fifth optical film.

13. A multi-layered optical film for use in a liquid crystal display device having pixel electrodes arranged in a matrix fashion with a specific gap therebetween, the multi-layered optical film comprising:
    a first low refractive film that exhibits a first refractive index;
    a first high refractive film formed on the first refractive film, the first high refractive film exhibiting a second refractive index higher than the first refractive index; and
    a first dielectric film formed on the first high refractive film, the first dielectric film exhibiting a specific resistance ranging from $1 \times 10^9$ Ωcm to $8 \times 10^{12}$ Ωcm,
    wherein the multi-layered optical film is formed on the pixel electrodes to prevent light to be incident below the pixel electrodes through the gap.

14. The multi-layered optical film according to claim 13, wherein the first dielectric film includes niobium oxide or a mixture of niobium oxide and tantalum oxide.

15. The multi-layered optical film according to claim 13 further comprising a second dielectric film including oxide silicon and formed on the first dielectric film.

16. The multi-layered optical film according to claim 13 further comprising a second low refractive film and a second high refractive film provided between the first high refractive film and the first dielectric film,
    wherein the second low refractive film is formed on the first high refractive film and exhibits a third refractive index lower than the second refractive index, and
    the second high refractive film is formed on the second low refractive film and exhibits a fourth refractive index higher than the third refractive index.

17. The multi-layered optical film according to claim 16 further comprising a second dielectric film including oxide silicon and formed on the first dielectric film.

* * * * *